(12) United States Patent
Jones et al.

(10) Patent No.: US 12,397,697 B2
(45) Date of Patent: Aug. 26, 2025

(54) LIFTGATE MOUNTING SYSTEM AND METHOD

(71) Applicant: Palfinger USA, LLC, Tiffin, OH (US)

(72) Inventors: Michael C. Jones, Torrance, CA (US); David Schauer, Omaha, NE (US)

(73) Assignee: PALFINGER USA, LLC, Tiffin, OH (US)

( * ) Notice: Subject to any disclaimer, the term of this patent is extended or adjusted under 35 U.S.C. 154(b) by 560 days.

(21) Appl. No.: 17/588,232

(22) Filed: Jan. 29, 2022

(65) Prior Publication Data

US 2023/0242026 A1 Aug. 3, 2023

(51) Int. Cl.
 *B60P 1/44* (2006.01)
(52) U.S. Cl.
 CPC ........... *B60P 1/4485* (2013.01); *B60P 1/4414* (2013.01)
(58) Field of Classification Search
 CPC ...... B60P 1/4485; B60P 1/4414; B62D 27/06; B62D 27/023
 USPC ................................. 296/182.1, 186.1, 186.3
 See application file for complete search history.

(56) References Cited

U.S. PATENT DOCUMENTS

| 5,685,230 | A | * | 11/1997 | Tegeler | B61D 17/08 |
| | | | | | 105/397 |
| 6,322,127 | B1 | * | 11/2001 | Masterson | B65D 90/14 |
| | | | | | 296/26.04 |
| 9,738,205 | B2 | * | 8/2017 | Parker | B60P 1/4414 |
| 9,840,181 | B2 | | 12/2017 | Hambardzumyan et al. | |
| 10,625,653 | B2 | | 4/2020 | Hambardzumyan et al. | |
| 10,981,487 | B1 | * | 4/2021 | Russo | B60P 1/4435 |
| 2023/0271540 | A1 | * | 8/2023 | Smolov | B60P 1/52 |
| | | | | | 414/501 |

FOREIGN PATENT DOCUMENTS

| DE | 102020113965 | A1 | * | 11/2021 | |
| GB | 2188027 | A | * | 9/1987 | ............ B60P 1/4485 |

OTHER PUBLICATIONS

Palfinger Liftgates LLC, ILD Plus Installation Manual & Check-Off Sheet, Mar. 5, 2018, U.S.A.

* cited by examiner

*Primary Examiner* — Jason S Daniels
(74) *Attorney, Agent, or Firm* — Hodgson Russ LLP

(57) ABSTRACT

An apparatus for mounting a liftgate column on a vehicle comprises a plurality of buttons attached to an outer housing of the liftgate column, wherein the plurality of buttons are arranged to project outwardly from a mounting wall of the housing and mate with the plurality of keyholes of the vehicle. Where the vehicle is without corresponding keyholes, a mounting member having corresponding keyholes is disclosed for welding to the vehicle.

6 Claims, 16 Drawing Sheets

LIFTGATE MOUNTING SYSTEM AND METHOD

FIELD OF THE DISCLOSURE

The present disclosure relates to a system and method for mounting a liftgate on a vehicle, for example a truck.

BACKGROUND OF THE INVENTION

Hydraulically powered liftgates are in widespread use on delivery trucks and other vehicles for assisting operators in loading and unloading cargo. Liftgates commonly have an H-shaped configuration comprising a pair of liftgate columns connected by a traverse member, and a lifting platform arranged between and supported by the columns. The liftgate columns include hydraulic lifting mechanisms operable in unison to raise and lower the liftgate platform between a street-level elevation and a vehicle cargo bed elevation. Liftgates of the type described above may be mounted to a rear end of the vehicle body as an accessory.

It is known to mount a liftgate to a vehicle body by welding the liftgate columns and traverse member to the corner posts and rear sill at the rear end of the vehicle. Before welding can begin, the mounting process involves preliminary steps including leveling the vehicle, positioning the liftgate with a forklift at a desired position flush with the vehicle corner posts and rear sill, and clamping the liftgate columns to the corner posts of the vehicle. If the rear sill is not flush with the rear surfaces of the corner posts, then additional subframing steps are necessary to weld subframe members to the corner posts to fill the gap and provide flush mounting surfaces on the vehicle. The known mounting process based on welding is disadvantageous because it consumes time, requires trained personnel, and is permanent.

U.S. Pat. Nos. 9,840,181 and 10,625,653 teach a liftgate mounting apparatus and method intended to address the disadvantages mentioned above. The apparatus includes a pair of mounting members configured to be welded to the rear corner posts of a vehicle. Each mounting member includes a plurality of protrusions for mating with corresponding openings in an outer housing of a liftgate column. A securing mechanism is provided within each liftgate column to prevent the liftgate column from shifting and possibly disengaging from the corresponding mounting member. The securing mechanism includes an L-shaped wedge member lodged between an uppermost one of the protrusions and an inner surface of the liftgate column to prevent horizontal shifting. The wedge member is fixed vertically by a clamping nut adjustably set on a vertical bolt extending through a tapped hole in the uppermost protrusion to engage a stop block attached to the inner surface of the liftgate column, whereby the liftgate column is restrained against vertical movement relative to the protrusions on the mounting member. The protrusions and the securing mechanism taught by U.S. Pat. Nos. 9,840,181 and 10,625,653 must compete with mechanical and hydraulic components of the lifting mechanism for free space within the housing of the liftgate column. The securing mechanism requires customized parts such as the L-shaped wedge member and the tapped uppermost protrusion, and is susceptible to loosening over time as the vehicle is used on bumpy streets and/or in environments experiencing wide variations in temperature. If a mounted liftgate is later removed from the vehicle, the mounting members with protrusions remain welded on the vehicle and pose an injury risk to persons walking near the rear end of the vehicle.

SUMMARY OF THE DISCLOSURE

The present disclosure describes an apparatus and a method for mounting a liftgate column on a vehicle that overcomes the disadvantages of the current state of the art noted above. According to one embodiment, the vehicle comes equipped with a plurality of keyholes, and the mounting apparatus comprises a plurality of buttons attached to an outer housing of the liftgate column, wherein the plurality of buttons are arranged to project outwardly from a mounting wall of the housing and mate with the plurality of keyholes of the vehicle.

According to another embodiment, the vehicle is not equipped with a plurality of keyholes, and the mounting apparatus further comprises a mounting member configured to be welded to the vehicle. The mounting member includes a plurality of keyholes with which the plurality of buttons attached to the outer housing of the liftgate column are arranged to mate. The mounting member may be part of an H-shaped bracket assembly having two such mounting members extending vertically and a transverse bridge member extending horizontally between the vertical mounting members, such that the two liftgate columns of a liftgate may be respectively mounted on the two mounting members.

A mounting method corresponding to the first embodiment summarized above comprises A) positioning the liftgate column relative to the vehicle such that the plurality of buttons are aligned with the plurality of keyholes; B) moving the liftgate column relative to the vehicle such that the plurality of buttons are received by the plurality of keyholes; and C) lowering the liftgate column relative to the vehicle to mate the plurality of buttons with the plurality of keyholes.

A mounting method corresponding to the second embodiment summarized above comprises A) providing a mounting member configured to be welded to a vehicle, the mounting member including a plurality of keyholes and a bolt hole; B) positioning the liftgate column relative to the mounting member such that the plurality of buttons are aligned with the plurality of keyholes; C) moving the liftgate column relative to the mounting member such that the plurality of buttons are received by the plurality of keyholes; D) moving the liftgate column relative to the mounting member to mate the plurality of buttons with the plurality of keyholes; E) installing a bolt to extend through the mounting hole in the mounting wall and through the bolt hole of the mounting member; F) threadably engaging the bolt with a nut; and G) welding the mounting member to the vehicle. Steps (A) through (F) may be performed before or after step (G) is performed.

BRIEF DESCRIPTION OF THE DRAWINGS

The nature and mode of operation of the present invention will now be more fully described in the following detailed description taken with the accompanying drawing figures, in which.

DETAILED DESCRIPTION OF THE INVENTION

Figure 1:
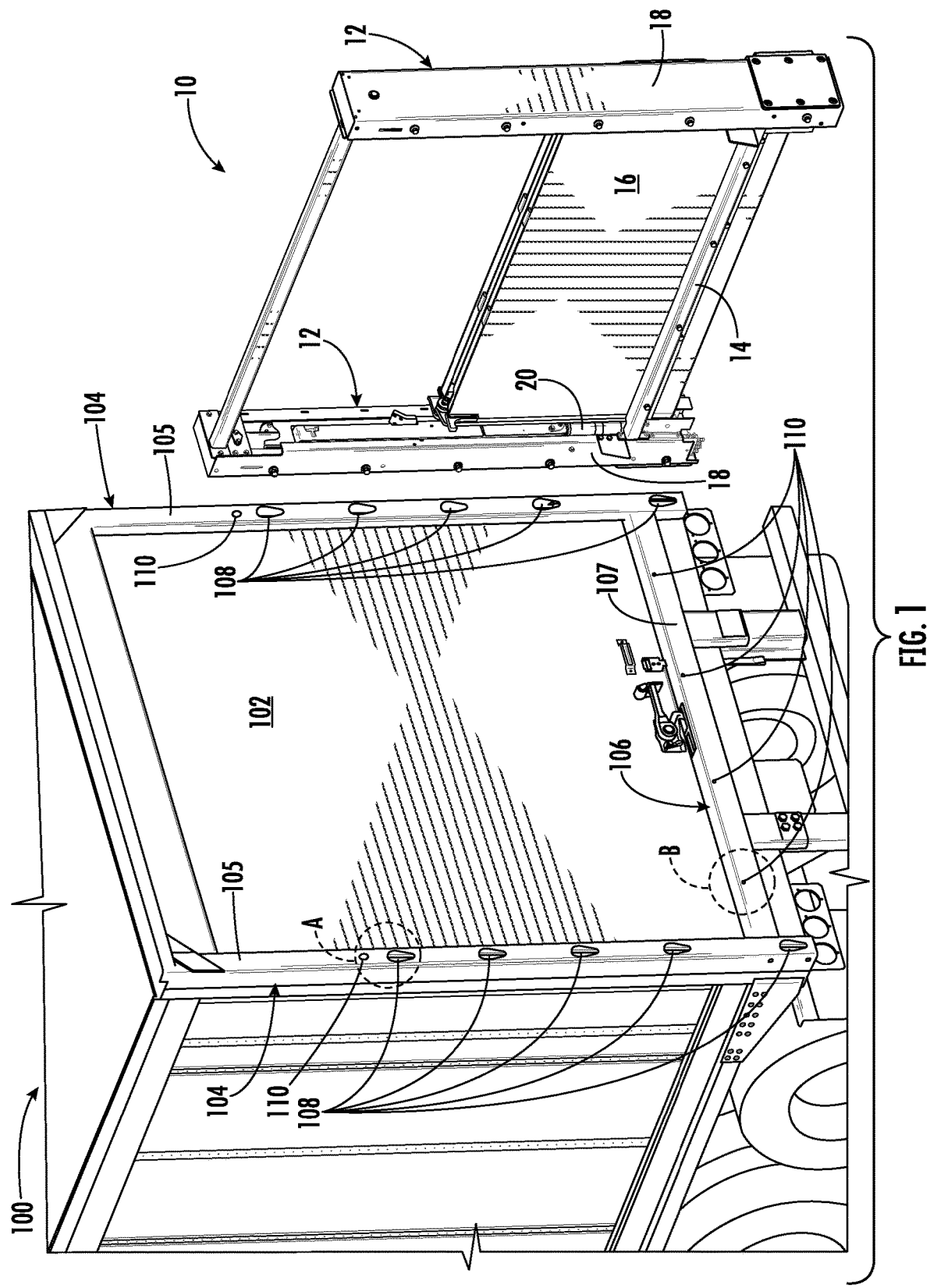
FIG. 1 is an exploded perspective view showing a liftgate and a vehicle to which the liftgate is mountable in accordance with a first embodiment of the present disclosure.

FIG. 1 shows a liftgate 10 and a vehicle 100 to which liftgate 10 is removably mountable in accordance with a first embodiment of the present disclosure.

Liftgate 10 generally comprises a pair of liftgate columns 12 substantially mirroring each other about a vertical centerline of liftgate 10, a traverse member 14 connecting the liftgate columns 12, and a foldable liftgate platform 16 supported between liftgate columns 12 for movement up and down relative to columns 12. Each liftgate column 12 includes an outer housing 18 and a hydraulically-powered lifting mechanism 20 within outer housing 18. The lifting mechanism 20 of each liftgate column 12 is coupled to platform 14. The respective lifting mechanisms 20 are operable in unison to raise and lower platform 14 along columns 12.

Vehicle 100 is depicted, by way of example, as a delivery truck having a rear door 102 permitting access to a cargo bed of the truck, a pair of rear corner posts 104 extending vertically on opposite sides of rear door 102, and a rear sill 106 extending transversely across the vehicle between rear corner posts 104 at the level of the cargo bed.

In the first embodiment of the present disclosure shown in FIGS. 1-9, the rear corner posts 104 and rear sill 106 are integral original parts of vehicle 100 that are configured for mounting liftgate 10 on vehicle 100, and liftgate 10 is configured for removable mounting on rear corner posts 104 and rear sill 106 as will be described in detail below. Rear corner posts 104 and rear sill 106 may be formed of a steel or stainless steel alloy, and surface treated (e.g., galvanized) by the manufacturer of the vehicle 100 as part of the vehicle manufacturing process.

Figure 1A:
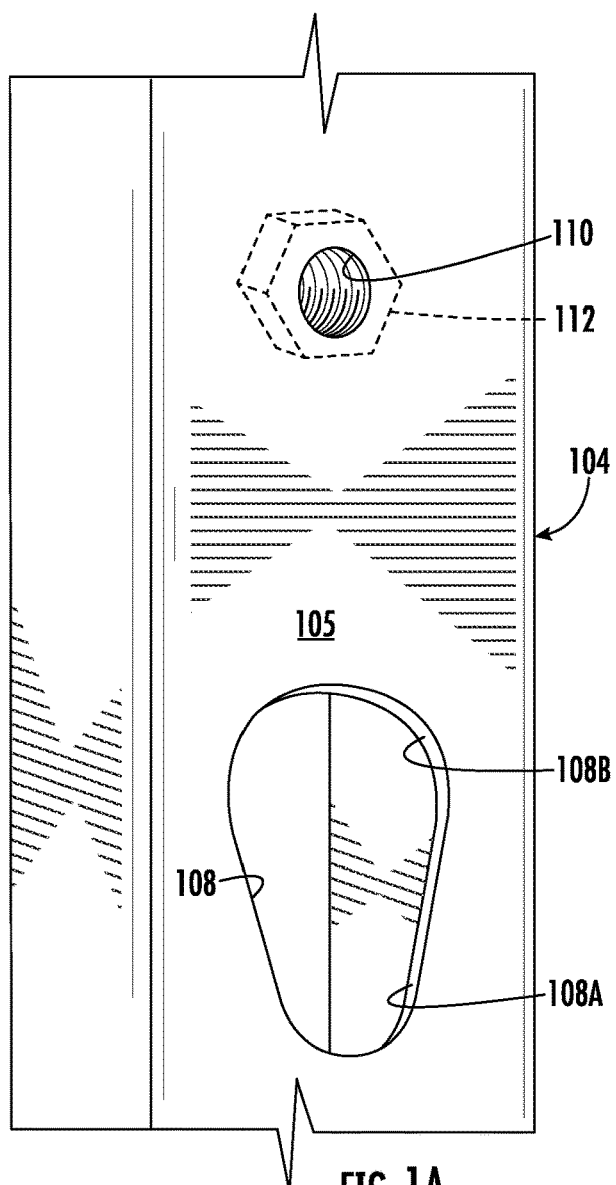
FIG. 1A is an enlarged view of detail region "A" in FIG. 1.
Figure 1B:
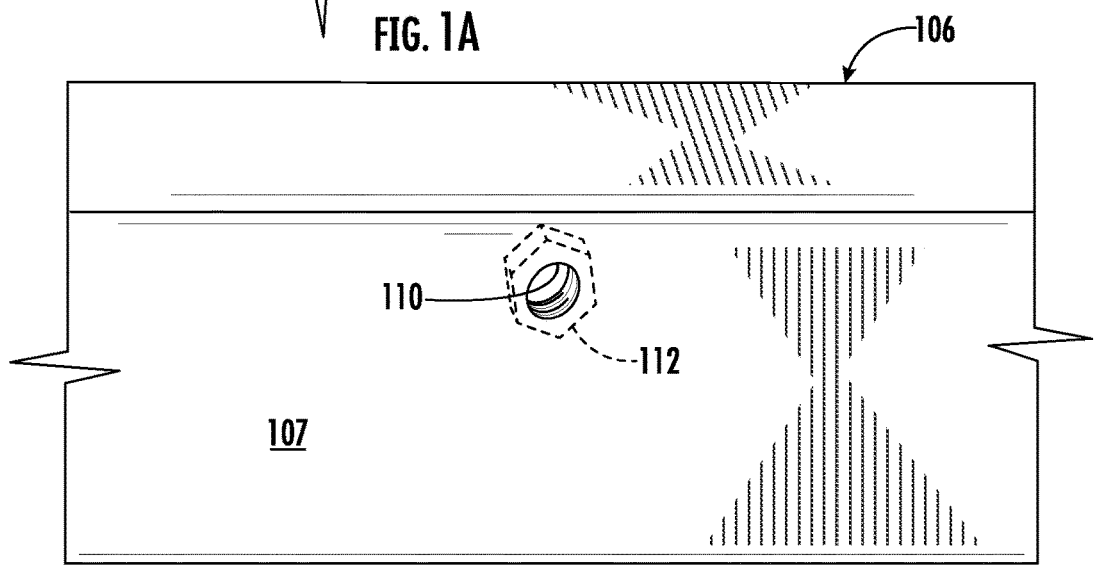
FIG. 1B is an enlarged view of detail region "B" in FIG. 1.
Figure 2:
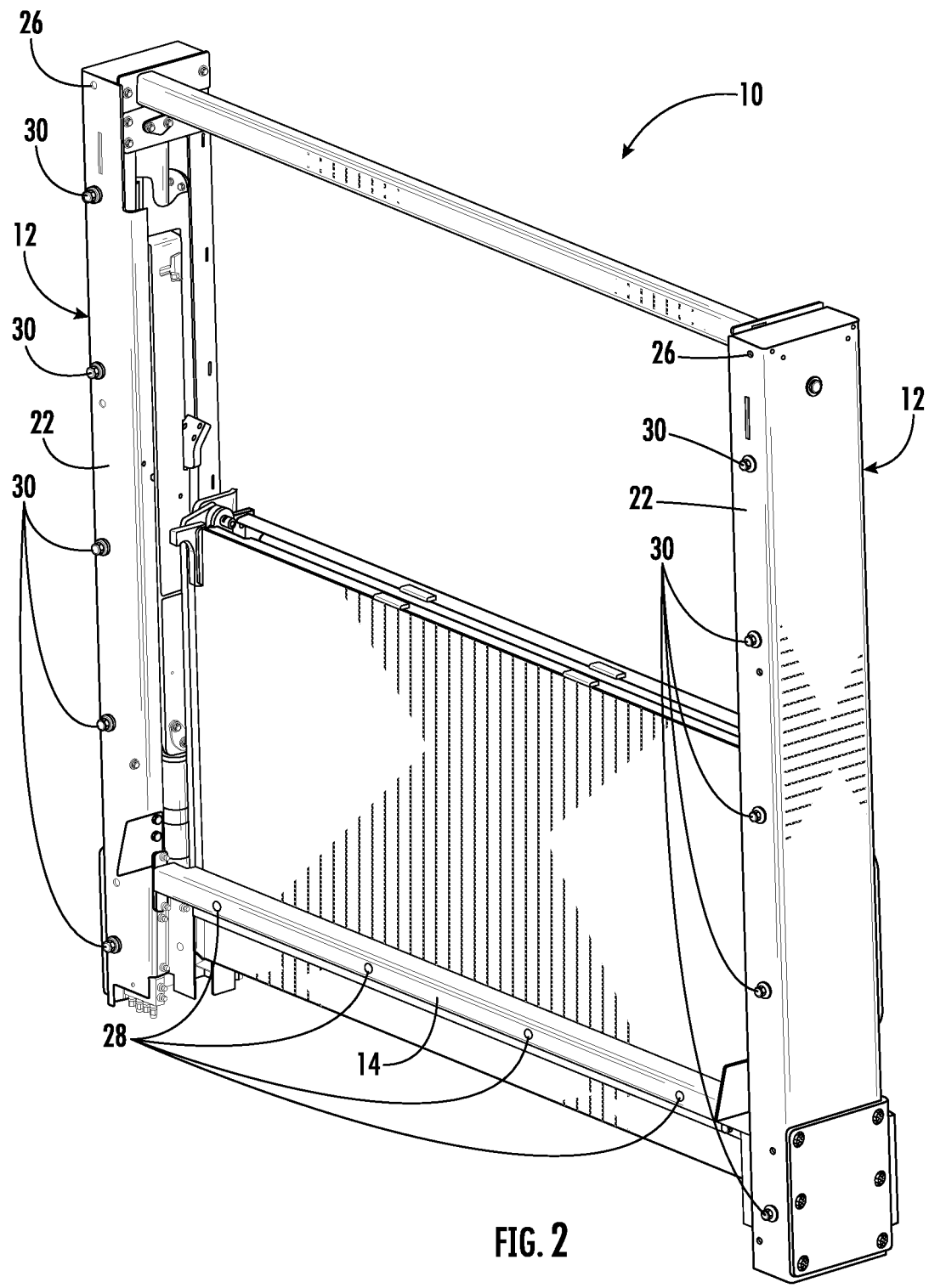
FIG. 2 is a front perspective view of a liftgate formed in accordance with the first embodiment of the present disclosure.
Figure 3:
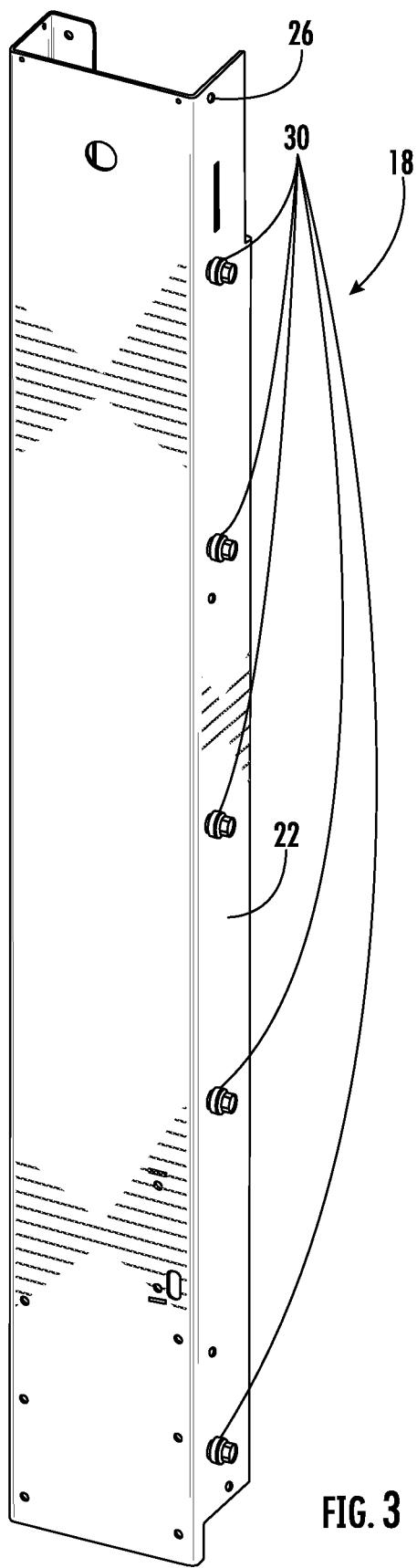
FIG. 3 is a perspective view of an outer housing of a liftgate column having a securement member arranged therein and a plurality of buttons attached thereto in accordance with an aspect of the present disclosure.
Figure 4:
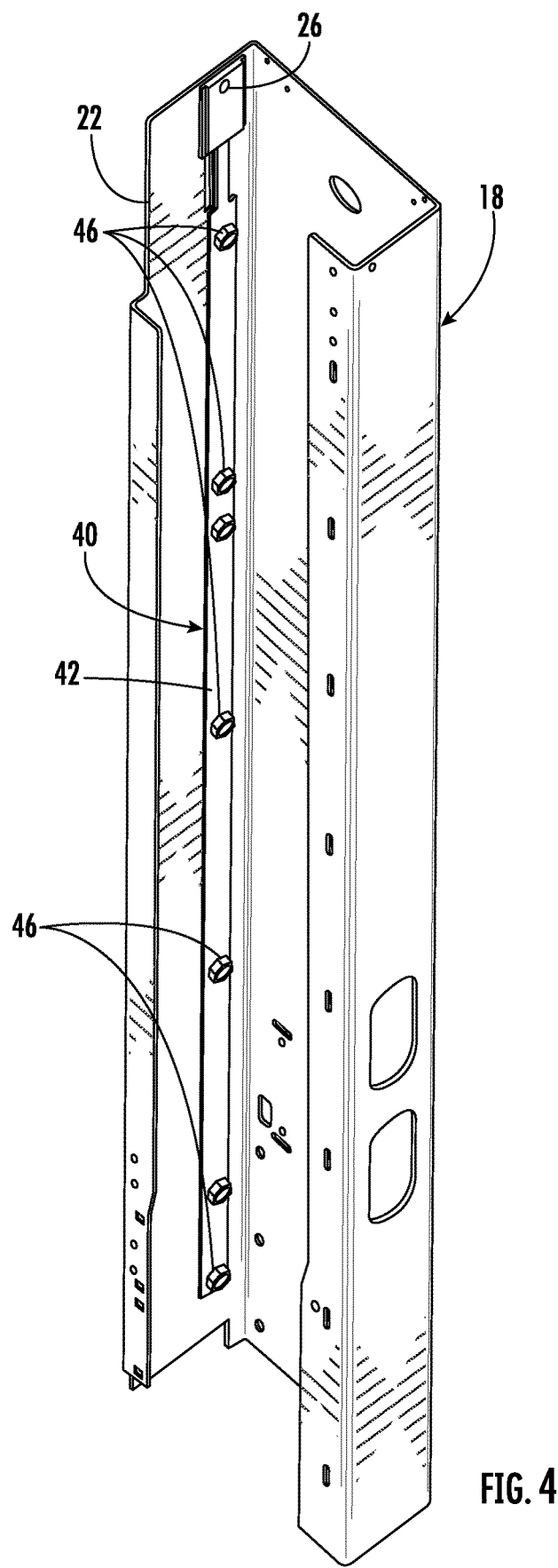
FIG. 4 is another perspective view of the outer housing of the liftgate column showing the securement member arranged therein in accordance with an aspect of the present disclosure.

Each rear corner post 104 may include a plurality of keyholes 108 and one or more bolt holes 110 formed through a rearwardly facing wall 105 of the corner post 104. Rear sill 106 may include a plurality of bolt holes 110 through a rearwardly facing wall 107 of rear sill 106. Rear corner posts 104 and rear sill 106 may be formed of metal channel to provide open interior space within the posts 104 and sill 106. Vehicle 100 may further include a plurality of nuts 112, shown for example in FIGS. 1A and 1B, that are fixed to interior surfaces of rearwardly facing walls 105 and 107 in respective alignment and association with bolt holes 110. The plurality of keyholes 108 of each rear corner post 104 may be vertically spaced from one another along the corner post 104. Each keyhole 108 may include a narrow portion 108A and a wide portion 108B above the narrow portion 108A.

Each liftgate column 12 includes a plurality of buttons 30 attached to outer housing 18 of the liftgate column. Buttons 30 are arranged to project outwardly from a mounting wall 22 of outer housing 18 to respectively mate with the plurality of keyholes 108 of vehicle 100 when mounting wall 22 is positioned against rearwardly facing wall 205 of the associated corner post 104. The plurality of buttons 30 of each liftgate column 12 may be vertically spaced from one another along the column 12. Each button 30 may include a stem 30A extending from mounting wall 22 and a head 30B at a distal end of the stem 30A, wherein the stem 30A is at least as narrow as the narrow portion 108A of the corresponding keyhole 108, and the head 30B is wider than the narrow portion 108A of the keyhole but fits within the wide portion 108B of the keyhole. Buttons 30 may be case hardened so the buttons resist wear and avoid fracture.

Figure 5:
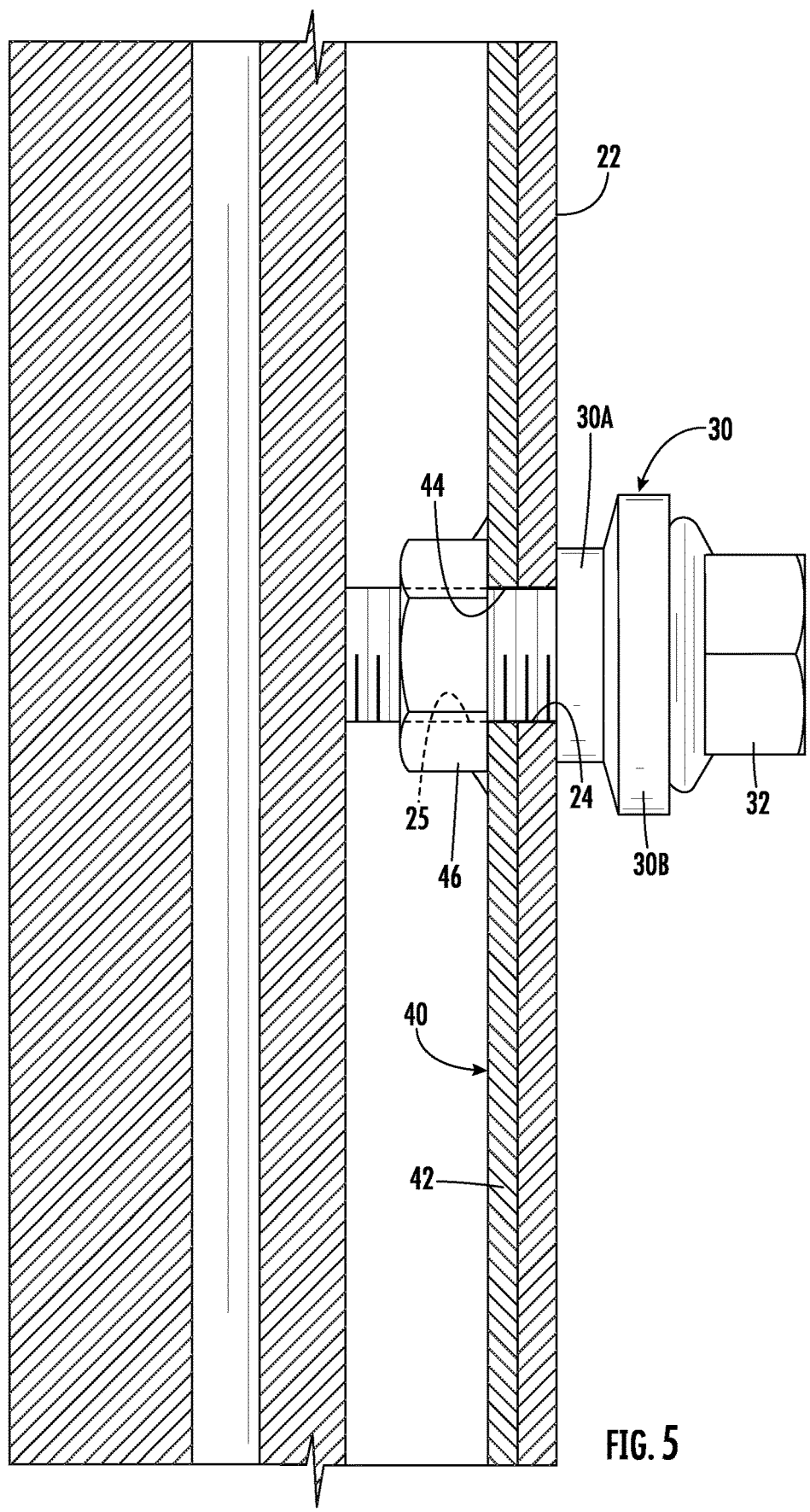
FIG. 5 is an enlarged side view showing attachment of one of the plurality of buttons to the outer housing of a liftgate column in accordance with an aspect of the present disclosure.

As best seen in FIG. 5, each button 30 may be attached to mounting wall 22 by a corresponding threaded fastener 32 arranged to extend through an axial hole 31 in the button 30 and through a corresponding fastener hole 24 through mounting wall 22 to the interior of outer housing 18, wherein the threaded fastener 32 mates in threaded engagement with a threaded hole 25 aligned with fastener hole 24 and fixed relative to outer housing 18.

In an aspect of the present disclosure, threaded holes 25 corresponding to fastener holes 24 and buttons 30 may be provided on a prefabricated securement member 40 fixedly attached, for example by welding and/or fasteners, to the interior surface of mounting wall 22. Securement member 40 may be formed from a strip 42 of metal plate drilled with holes 44 corresponding to fastener holes 24 in mounting wall 22, and having a plurality of nuts 46 welded to a rear surface of strip 42 in alignment with holes 44.

Figure 8:
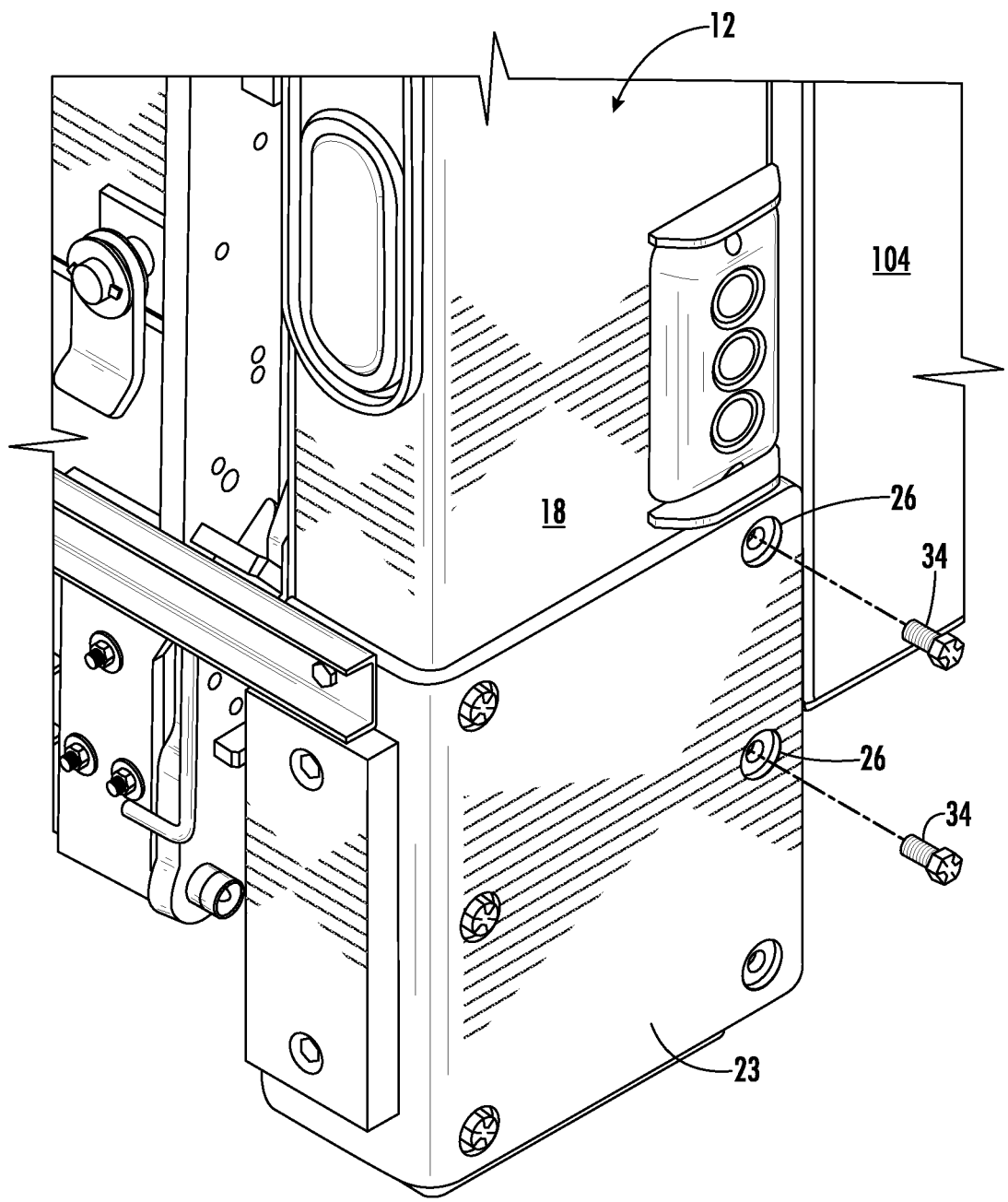
FIG. 8 is a perspective view illustrating installation of lower mounting bolts as part of the mounting method.

Each liftgate column 12 may include one or more mounting holes 26 through mounting wall 22. Each mounting hole 26 may be arranged to align with a corresponding bolt hole 110 and fixed nut 112 on vehicle 100 when buttons 30 are mated with keyholes 108 on vehicle 100. For example, in the present embodiment, a mounting hole 26 is located above the plurality of buttons 30. While only one mounting hole 26 is depicted for each lift column 12 in FIGS. 1 and 2, one or more additional mounting holes 26 may be provided on each lift column 12, for example at a lower portion of each lift column 12 as shown in FIG. 8. Also as illustrated by FIG. 8, mounting holes 26 may be formed through a side wall 23 of an extension of outer housing 18 for alignment with bolt holes (not shown) through a side wall of rear corner post 104.

Traverse member 14 of liftgate 10 may include a plurality of mounting holes 28 arranged at spaced intervals along the traverse member to align with bolt holes 110 in rearwardly facing wall 107 of rear sill 106 and with fixed nuts 112 on the interior surface of rearwardly facing wall 107.

Figure 6:
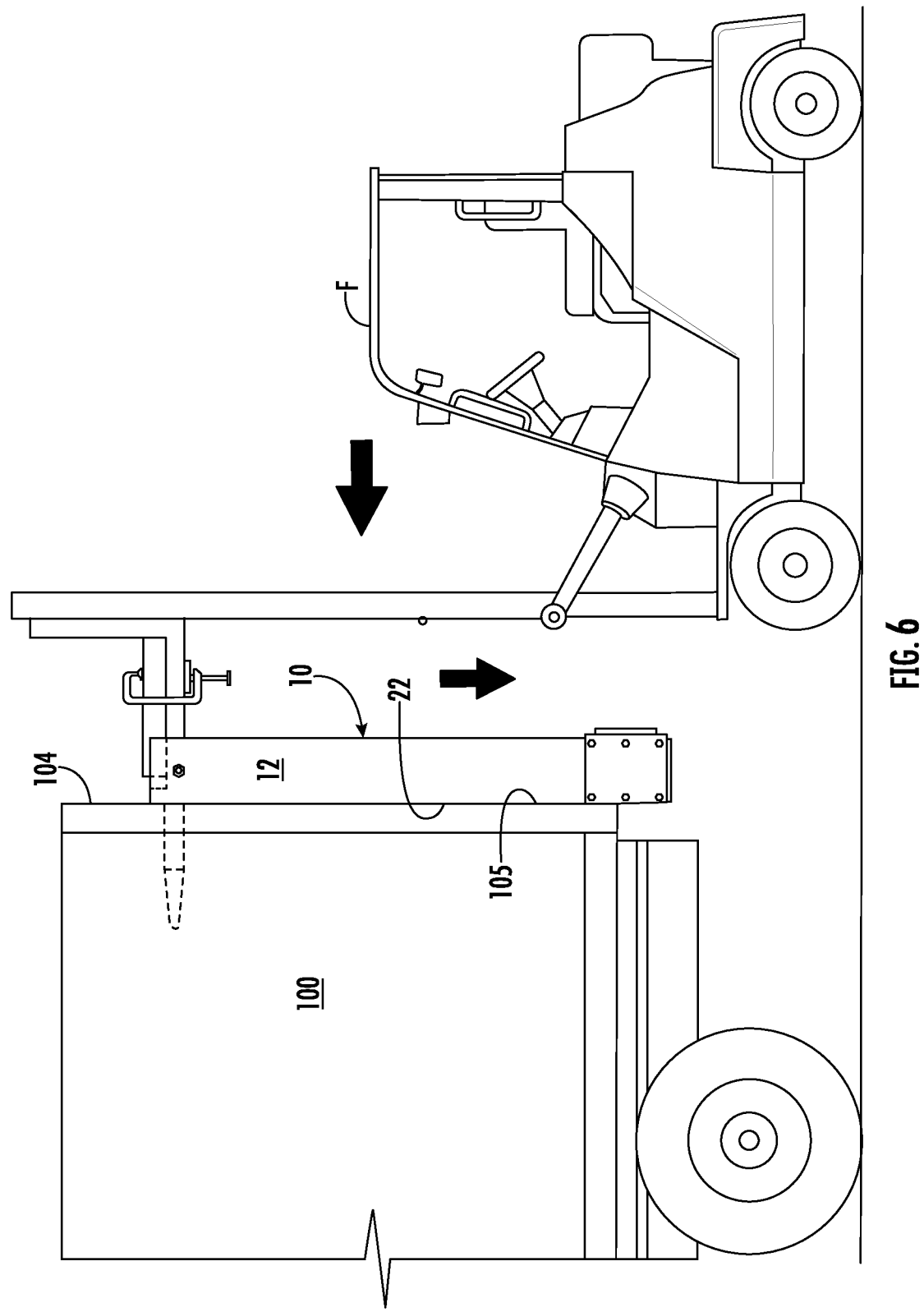
FIG. 6 is a side elevational view illustrating a method of mounting a liftgate on a vehicle in accordance with the first embodiment of the present disclosure.

A method of mounting liftgate 10 on vehicle 100 in accordance with the first embodiment will now be described. As shown in FIG. 6, the vehicle 100 may be parked and leveled such that rear corner posts 104 extend vertically, and liftgate 10 may be supported on a forklift F such that liftgate columns 12 extend vertically and face the rear corner posts 104. Liftgate 10 may be moved relative to vehicle 100, for example by operating forklift F, to position each liftgate column 12 relative to vehicle 100 such that the plurality of buttons 30 on each liftgate column 12 are aligned with the plurality of keyholes 108 in the corresponding rear corner post 104. More specifically, the enlarged head 30B of each button 30 is aligned with the wide portion 108B of the corresponding keyhole 108.

Next, liftgate 10 including liftgate columns 12 is moved relative to vehicle 100, for example by advancing forklift F toward the rear of vehicle 100, such that the plurality of buttons 30 are received by the plurality of keyholes 108. As may be understood, the enlarged head 30B of each button 30 is inserted into the wide portion 108B of the corresponding keyhole 108.

Once the buttons 30 projecting from each liftgate column 12 are received by keyholes 108 in the associated rear corner post 104, liftgate 10 including liftgate columns 12 may be lowered relative to vehicle 100, for example by lowering the carriage and forks of forklift F, to mate the buttons 30 with the keyholes 108. In particular, liftgate 10 is lowered such that the narrow stem 30A of each button 30 passes through the narrow portion 108A of the keyhole. At this stage, liftgate 10 is supportably mounted on vehicle 100 and is not removable except by raising liftgate 10 relative to vehicle 100 and withdrawing liftgate 10 away from the vehicle.

Figure 7:
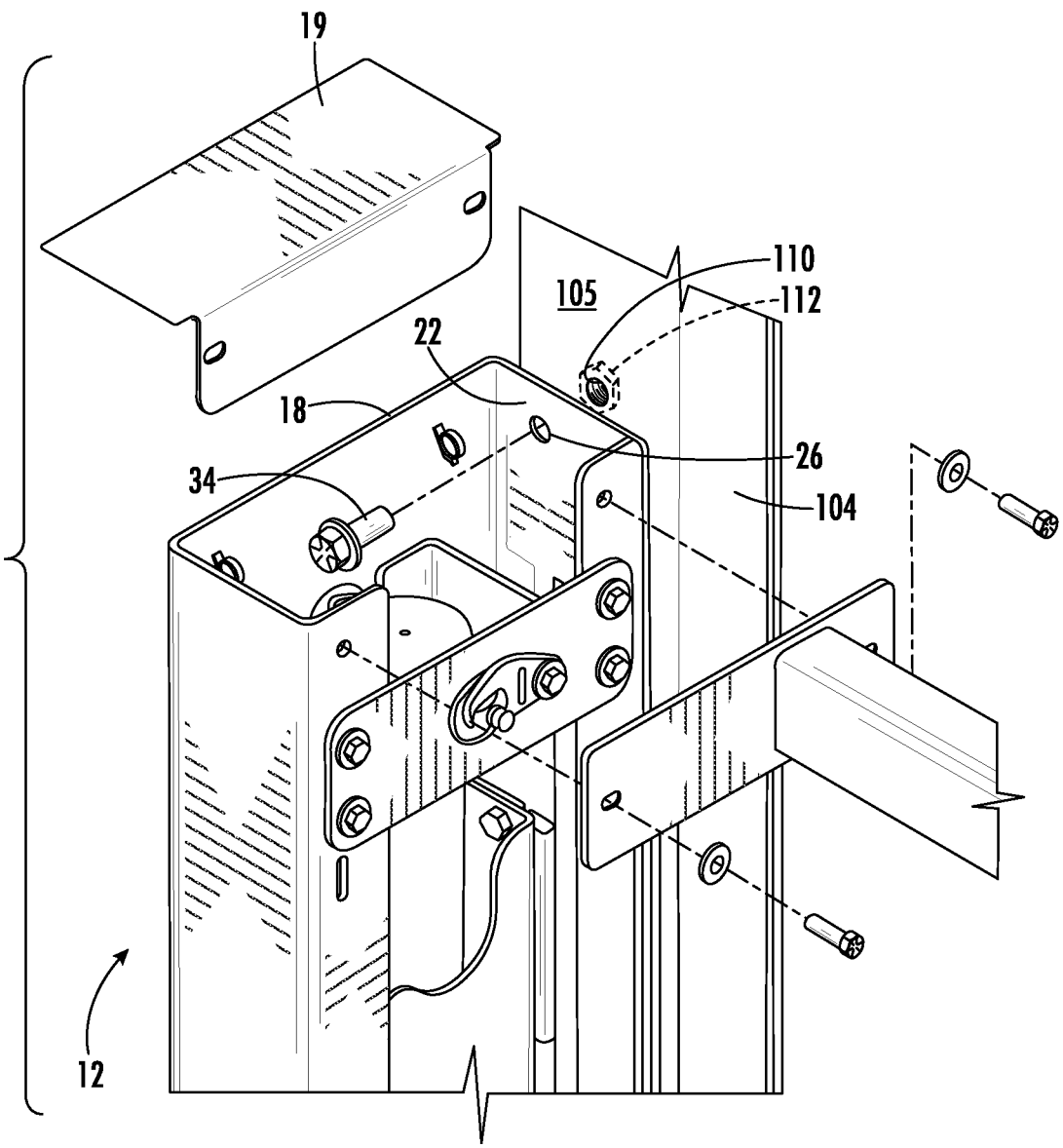
FIG. 7 is a perspective view illustrating installation of an upper mounting bolt as part of the mounting method.

The method may include further steps for securing each liftgate column 12 to its associated rear corner post 104 to prevent the liftgate columns 12 from moving upward relative to vehicle 100 and potentially becoming disengaged from vehicle 100 when the vehicle 100 is being driven on a bumpy roadway. In the illustrated embodiment, a respective bolt 34 may be installed by arranging the bolt to extend through mounting hole 26 in mounting wall 22 and through the bolt hole 110 in vehicle 100, and threadably engaging the bolt 34 with the fixed nut 112 associated with the bolt hole 110. By way of non-limiting example, and as shown in FIG. 7, a top cover 19 removably fastened to outer housing 18 may be temporarily removed, and bolt 34 may be inserted into the interior of outer housing 18, positioned through mounting hole 26 and bolt hole 110, and tightened in threaded engagement with fixed nut 112. If additional mounting holes 26 are provided as shown in FIG. 8, and rear corner post 104 is configured with corresponding bolt holes 110 and fixed nuts 112, then additional bolts 34 may be installed to further secure liftgate column 12 to rear corner post 104. Bolts, nuts, and other hardware mentioned herein may be Grade A hardware.

Figure 9:
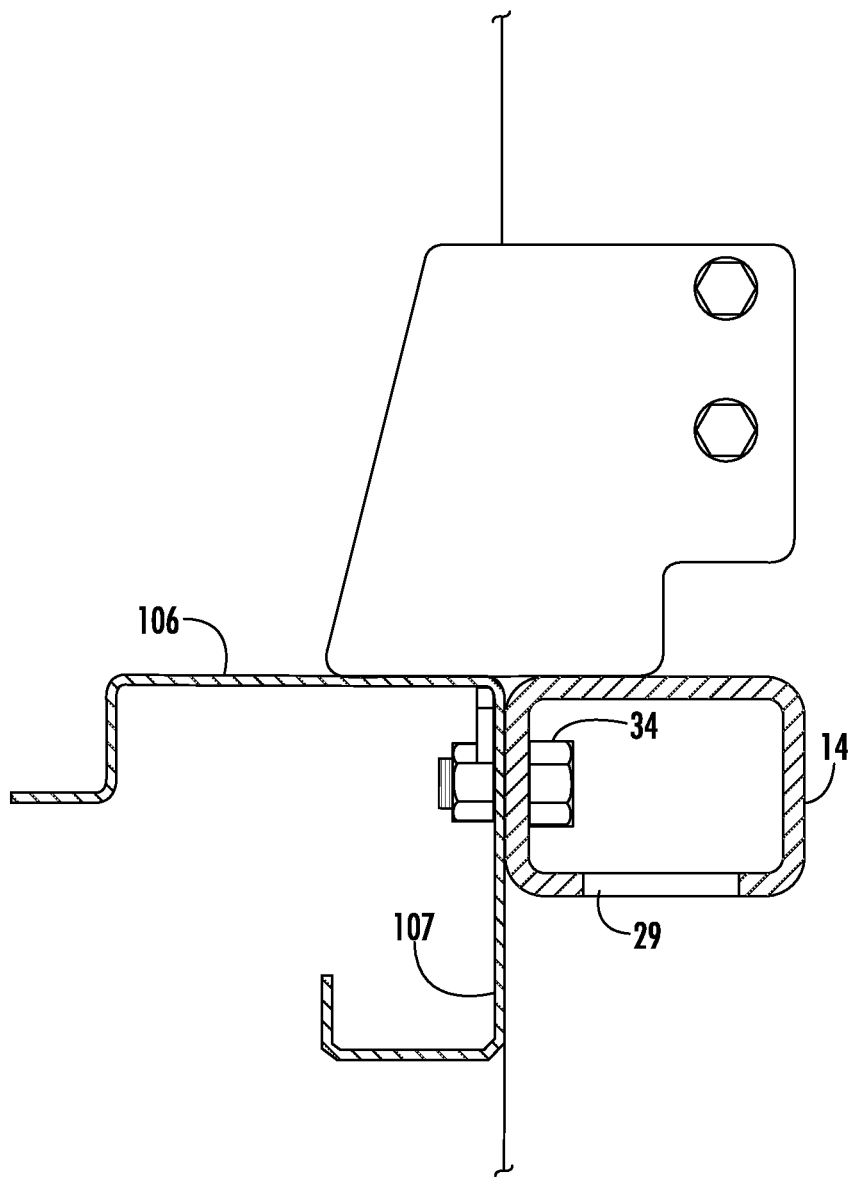
FIG. 9 is a cross-sectioned side view showing connection of a liftgate traverse member to a rear sill of the vehicle in accordance with the first embodiment of the present disclosure.

The method may include further steps for securing traverse member 14 of liftgate 10 to rear sill 106 of vehicle 100. As illustrated in FIG. 9, a respective bolt 34 may be arranged to extend through each mounting hole 28 in traverse member 14 and through the corresponding bolt hole 110 in rear sill 106 of vehicle 100 to threadably engage with the fixed nut 112 associated with the bolt hole 110. Traverse member 14 may be a segment of rectangular tubing having a plurality of openings 29 through a bottom wall of the tubing at locations corresponding to mounting holes 28 to facilitate installation of bolts 34 through mounting holes 28.

Once liftgate 10 is securely mounted on vehicle 100 as described above, the carriage and forks of forklift F may be lowered further to relinquish support of liftgate 10 to vehicle 100, and forklift F may be moved away from vehicle 100.

Advantageously, the first embodiment described above enables liftgate 10 to be mounted on vehicle 100 without any welding operations. As a result, the task of mounting liftgate 10 on vehicle 100 requires less time and less skill on the part of the labor team.

In accordance with the first embodiment, liftgate 10 may be removed from vehicle 100 quickly and easily by reversing the mounting steps described above. For example, if liftgate 10 becomes damaged, it can be removed and serviced, and a replacement liftgate may be mounted on vehicle 100 while the damaged liftgate is repaired. Or, if a new liftgate is desired, it is a simple matter to swap a previously mounted liftgate for a new liftgate.

In the first embodiment described above, the rear corner posts 104 and rear sill 106 of vehicle 100 are configured for mounting liftgate 10 by virtue of keyholes 108, bolt holes 110, and fixed nuts 112. In a second embodiment of the present disclosure described with reference to FIGS. 10-13B, the rear corner posts 104 and rear sill 106 of vehicle 100 are not configured for mounting liftgate 10 on vehicle 100. Thus, in accordance with the second embodiment, a bracket assembly 200 may be provided for welding onto vehicle 100 to configure the vehicle for removable mounting of liftgate 10.

Figure 11:
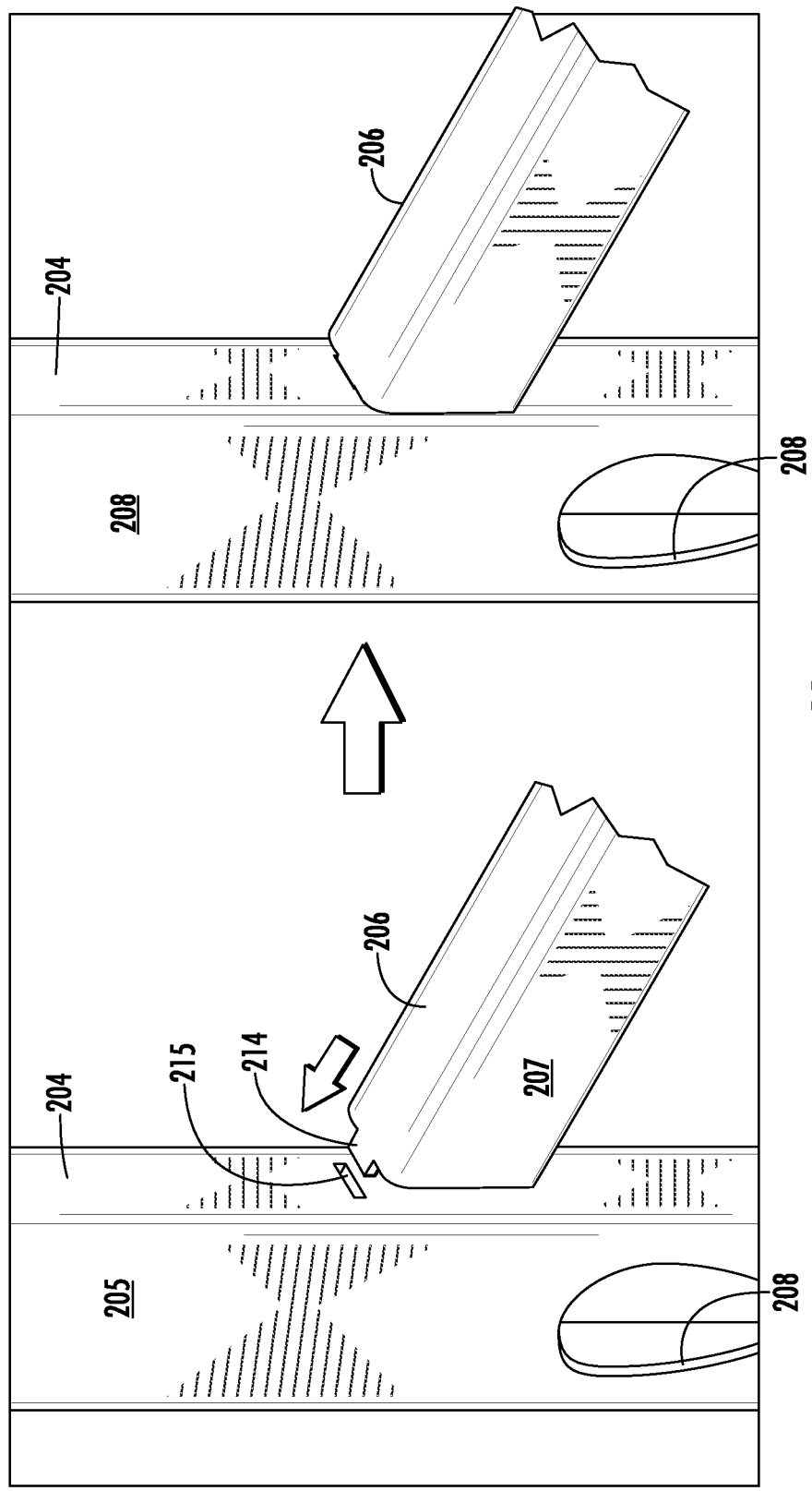
FIG. 11 is a perspective view showing connection of a transverse bridge member of the bracket assembly to a vertical mounting member of the bracket assembly.
Figure 12:
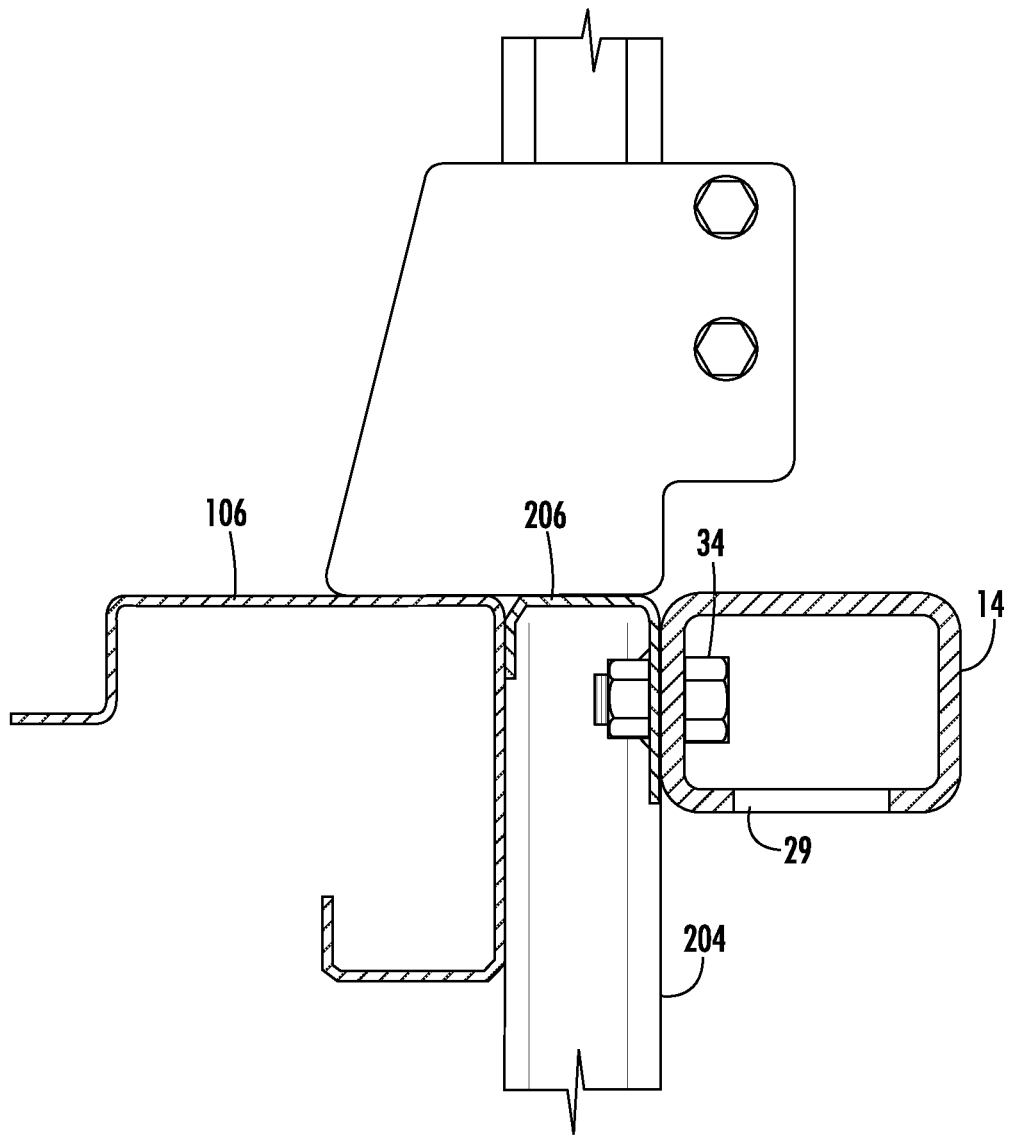
FIG. 12 is a cross-sectioned side view showing connection of a liftgate traverse member to the bridge member of the bracket assembly in accordance with the second embodiment of the present disclosure.

Bracket assembly 200 may include first and second vertical mounting members 204 and a transverse bridge member 206 connecting the first and second vertical mounting members 204, wherein each of the first and second vertical mounting members 204 comprises a plurality of keyholes 208. As illustrated in FIG. 11, transverse bridge member 206 may connect to each vertical mounting member 204 by way of a pair of end tabs 214 respectively protruding from opposite ends of ends of transverse bridge member 206 for receipt by corresponding slots 215 facing sidewalls of vertical mounting members 204, only one end tab 214 and slot 215 being visible in FIG. 11. Vertical mounting members 204 and transverse bridge member 206 may be formed of a suitable material such as a steel alloy or stainless steel alloy. Surface treatment of the members 204, 206 may be selected based at least in part on the expected type of vehicle 100 and expected end use environmental conditions. For example, members 204, 206 may be galvanized, painted, and/or treated with other types of protective coatings. With regard to protective surface treatments, extra attention may be paid to the weld seams by which members 204 and 206 are attached to vehicle 100, as described below, subsequent to attachment.

Each of the vertical mounting members 204 may further comprise one or more bolt holes 210 formed through a rearwardly facing wall 205 of the vertical mounting member 204. Transverse bridge member 206 may include a plurality of bolt holes 210 through a rearwardly facing wall 207 of the transverse bridge member. Vertical mounting members 204 and transverse bridge member 206 may be formed of metal channel to provide open interior space within the vertical mounting members 204 and bridge member 206. Bracket assembly 200 may further include a plurality of nuts 212 fixed to interior surfaces of rearwardly facing walls 205 and 207 in respective alignment and association with bolt holes 210, as shown in FIGS. 10A and 10B. The plurality of keyholes 208 of each vertical mounting member 204 may be vertically spaced from one another along the vertical mounting member 204. Similar to keyholes 108 of the first embodiment, each keyhole 208 may include a narrow portion 208A and a wide portion 208B above the narrow portion 208A.

As may be understood, the keyholes 208, bolt holes 210, and fixed nuts 212 of bracket assembly 200 serve the same functions as keyholes 108, bolt holes 110, and fixed nuts 112 of the first embodiment, and thus may have the same or a similar configuration as keyholes 108, bolt holes 110, and fixed nuts 112 of the first embodiment for mating with features of liftgate 10 as described above.

Figure 10:
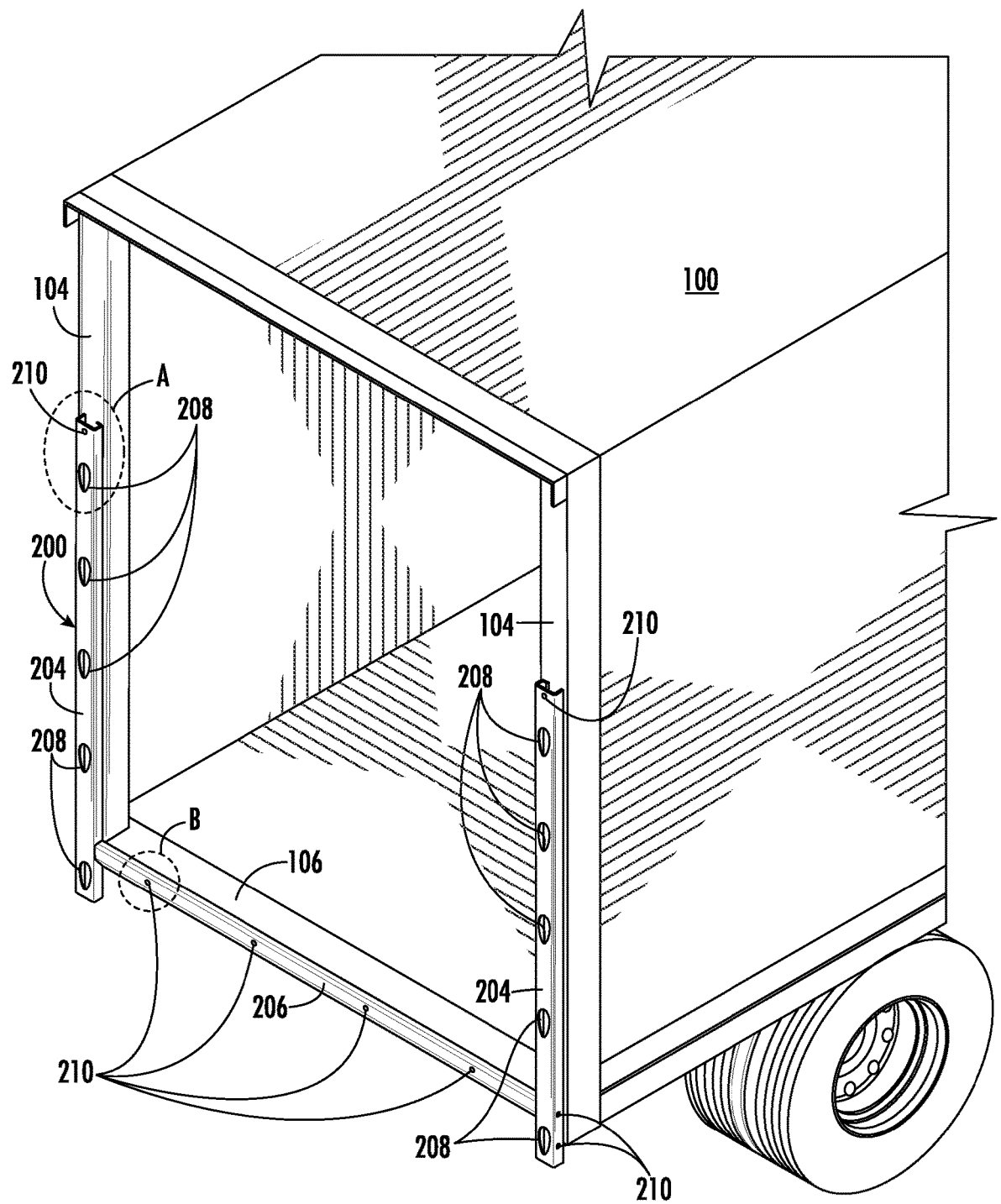
FIG. 10 is a perspective view showing a bracket assembly of a liftgate mounting system formed in accordance with a second embodiment of the present disclosure, wherein the bracket assembly is configured to be welded to a vehicle.
Figure 10A:
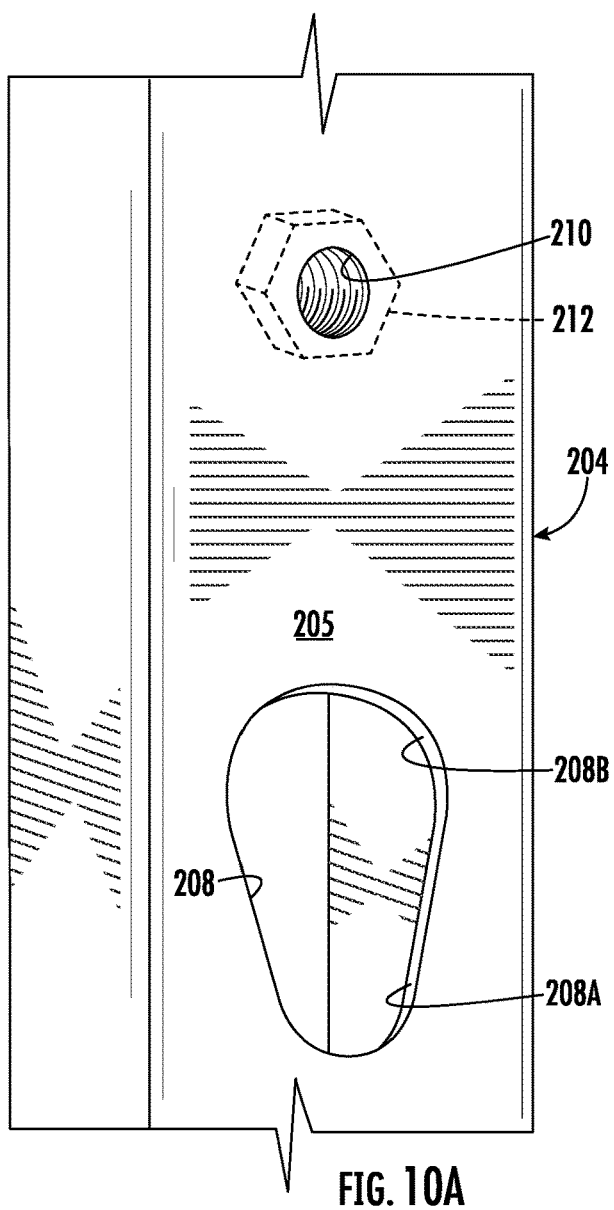
FIG. 10A is an enlarged view of detail region "A" in FIG. 10.
Figure 10B:
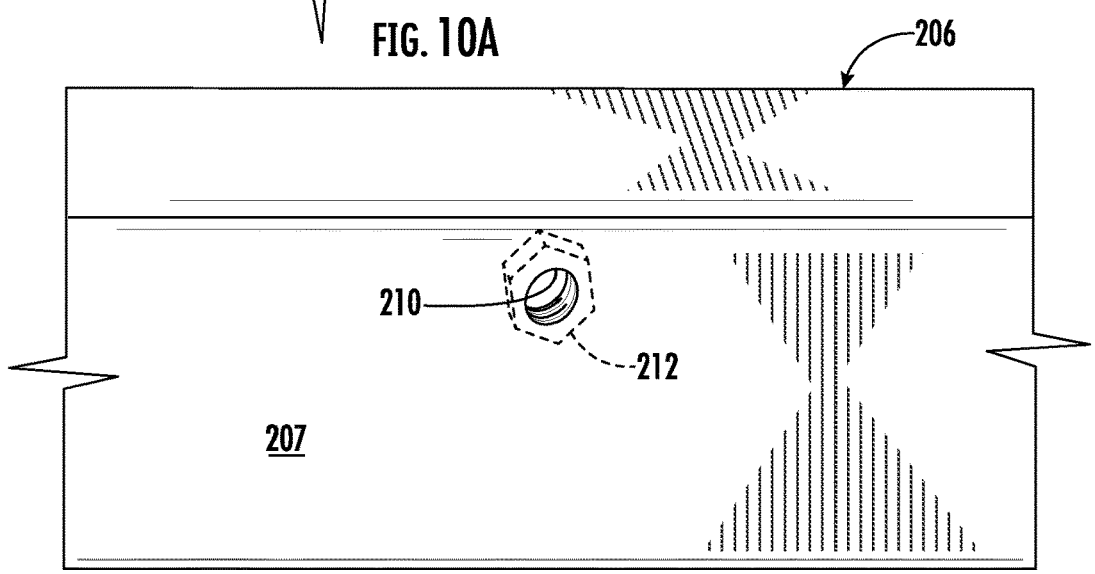
FIG. 10B is an enlarged view of detail region "B" in FIG. 10.

Bracket assembly 200 of the second embodiment may be attached to vehicle 100 separately from liftgate 10, as illustrated by FIG. 10. For example, bracket assembly 200 may be welded to the rear of vehicle 100. Each vertical mounting member 204 may be welded to a respective rear corner post 104 of vehicle 100 by a series of intermittent welds on each side of vertical mounting member 204. By way of non-limiting example, the welds may be ¼-inch fillet welds, each two-inches in length, spaced at eighteen-inch intervals along the length of vertical mounting member 204. Transverse bridge member 206 may be welded to rear sill 106 of vehicle 100 by a series of intermittent welds along the top and bottom edges of transverse bridge member 206. For example, if vehicle 100 has a width of ninety-six inches, then the welds may be ¼-inch fillet welds, each two-inches in length, spaced at twenty-inch intervals along the length of transverse bridge member 206. As another example, if vehicle 100 has a width of one-hundred two inches, then the spacing interval of the welds may be adjusted to twenty-two inches.

In the example described above, it is presumed that the rearwardly facing surfaces of rear corner posts 104 and rear sill 106 are flush with one another, i.e., all surfaces lie in the same plane. Some vehicles may have configurations with irregular shaped sills, wherein the rearwardly facing surface of rear sill 106 is not flush with the rearwardly facing surfaces of corner posts 104. These situations may be remedied with a process referred to as subframing and/or flushing the sill, whereby a subframe is built up on rear corner posts 104 using correct size 3/16 inch or greater wall tubing. The welding installation procedure for mounting assembly 200 does not change.

Once bracket assembly 200 is fixedly attached to vehicle 100, liftgate 10 may be mounted on vehicle 100 and removed from vehicle 100 as described above in reference to the first embodiment.

Figure 13:
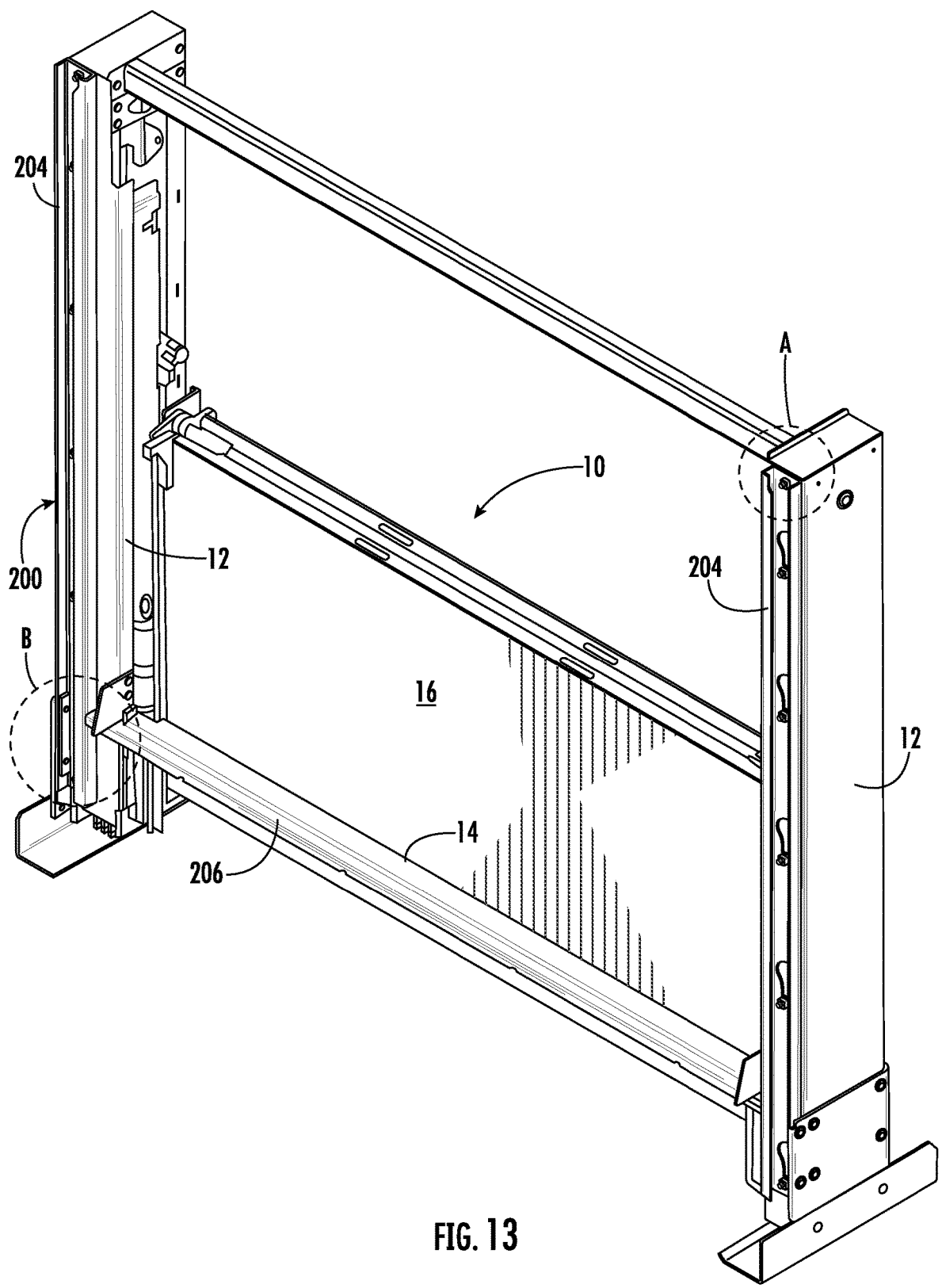
FIG. 13 is a perspective view of a pre-assembled liftgate and mounting bracket assembly according to an alternative version of the second embodiment.
Figure 13A:
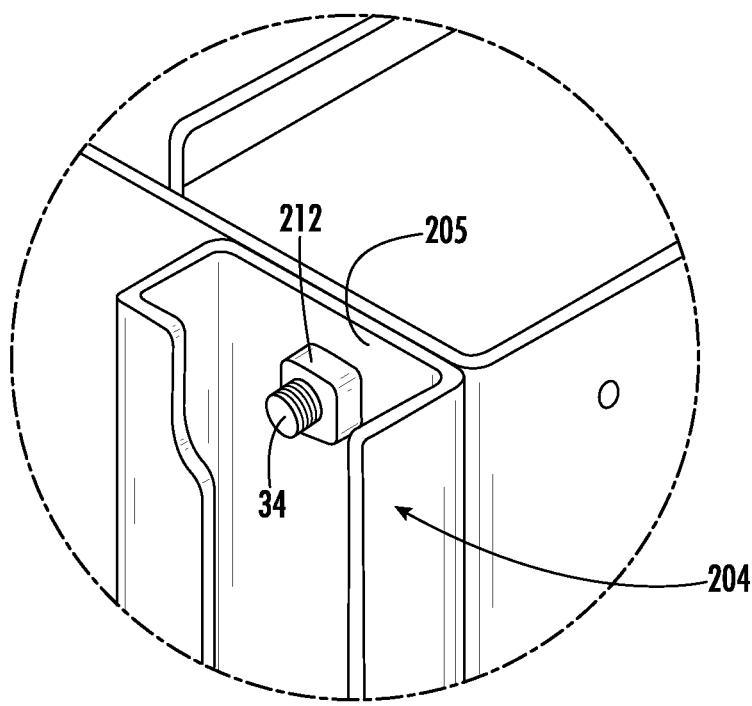
FIG. 13A is an enlarged view of detail region "A" in FIG. 13.
Figure 13B:
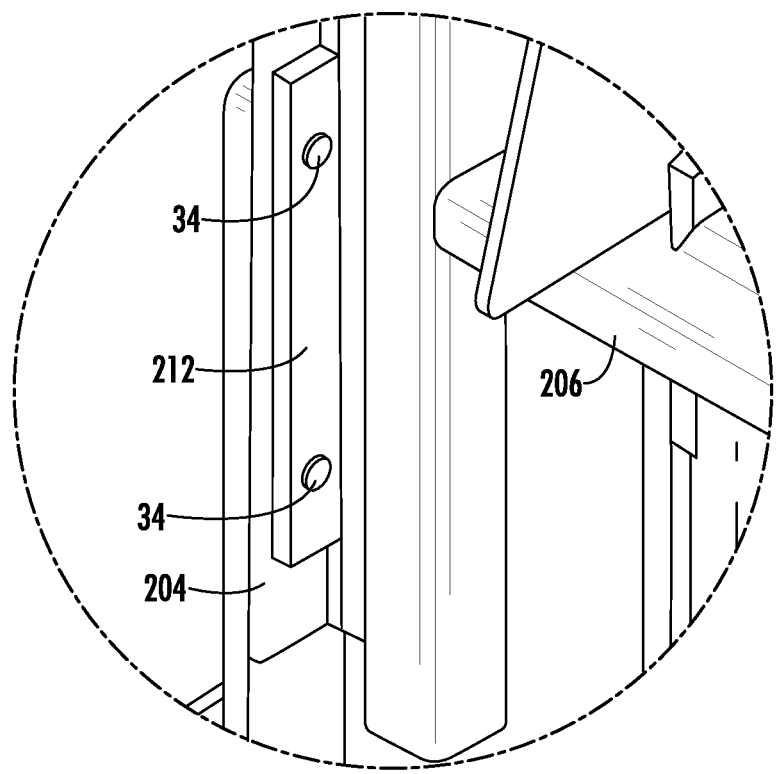
FIG. 13B is an enlarged view of detail region "B" in FIG. 13.

In an alternative version of the second embodiment, bracket assembly 200 and liftgate 10 may be attached to vehicle 100 as a preassembled unit, as illustrated by FIG. 13. In the alternative version, liftgate 10 is preinstalled on bracket assembly 200 prior to welding bracket assembly 200 on vehicle 100. Liftgate 10 is preinstalled on bracket assembly 200 by mating buttons 30 on liftgate columns 12 with keyholes 208 on vertical mounting members 204. Liftgate 10 may be secured to bracket assembly 200 by arranging respective bolts 34 to extend through corresponding mounting holes 26 in liftgate column mounting walls 22 and through corresponding bolt holes 210 in vertical mounting members 204, and threadably engaging the bolt 34 with the fixed nut 212 associated with the bolt hole 210, in a manner analogous to that disclosed for securing liftgate columns 12 to rear corner posts 104 in the first embodiment. Additionally, liftgate 10 may be secured to bracket assembly 200 by arranging respective bolts 34 to extend through mounting holes 28 in traverse member 14 and through corresponding bolt holes 210 in transverse bridge member 206 of bracket assembly 200 to threadably engage with fixed nuts 212 associated with the bolt holes 210, in a manner analogous to that disclosed for securing traverse member 14 to rear sill 106 in the first embodiment.

Prior to welding bracket assembly 200 with attached liftgate 10 on vehicle 100, preliminary steps may be carried out to help ensure the bracket assembly is properly positioned against vehicle 100 when the bracket assembly is welded to the vehicle. Vehicle 100 may be levelled by parking the vehicle on level ground, and adjusting tire pressures if necessary, such that rearwardly facing surfaces of rear corner posts 104 and rear sill 106 are vertical. The liftgate 10 and bracket assembly 200 may be safely attached to and supported by a forklift, and the forklift may be operated to position vertical mounting members 204 and transverse bridge member 206 flush against rear corner posts 104 and rear sill 106, respectively. After positioning bracket assembly 200 against vehicle 100, centering may be checked by measuring the distance from the outer edge of each vertical mounting member 204 to the outer edges of the corresponding rear corner post 104 at various locations along the vertical mounting members 204 to ensure the distances are equal. Bracket assembly may be measured to confirm that vertical mounting members 204 are square and parallel, for example by using a framing square to verify vertical mounting members 204 are square at 90° to transverse bridge member 206 and to vehicle rear sill 106. Once proper positioning is confirmed, liftgate 10 and bracket assembly 200 may be securely clamped flush against vehicle 100, for example by using four "F" style clamps, two at the top and bottom of one liftgate column 12, and two at the top and bottom of the other liftgate column 12. Finally, precautionary measures may be taken so that vertical mounting members 204 and liftgate columns 12 do not "toe-out" during welding. For example, flat metal bar or round stock may be added at the corner junctions to act as braces to minimize pull from welding.

Once the preliminary steps have been carried out, bracket assembly 200 may be welded to vehicle 100, for example in the manner described above with reference to FIG. 10. Following completion of the welding operation, the forklift, clamps, and braces may be removed.

As may be understood, liftgate 10 may be removed from vehicle 100 and remounted on vehicle 100 as described above.

As used herein, the term "fixed nut" encompasses not only a nut that has been fixed to a structural member, for example by welding the nut to the member, but also a hole that has been drilled and tapped in a structural member, and a hole that has been drilled in a structural member and fitted with a threaded insert.

While the present disclosure describes exemplary embodiments, the detailed description is not intended to limit the scope of the appended claims to the particular embodiments set forth. The claims are intended to cover such alternatives, modifications and equivalents of the described embodiments as may be included within the scope of the claims.

What is claimed is:

1. An apparatus for mounting a liftgate on a vehicle, wherein the liftgate comprises a first liftgate column, a second liftgate column, and a traverse member connecting the first and second liftgate columns, each of the first and second liftgate columns comprising an outer housing having a mounting wall, the apparatus comprising:
   a bracket assembly configured to be welded to the vehicle, the bracket assembly including a first vertical mounting member, a second vertical mounting member, and a transverse bridge member connecting the first and second vertical mounting members, wherein each of the first and second vertical mounting members includes a plurality of keyholes;
   a first plurality of buttons attached to the outer housing of the first liftgate column, the first plurality of buttons being arranged to project outwardly from the mounting wall of the first liftgate column and mate with the plurality of keyholes of the first vertical mounting member; and
   a second plurality of buttons attached to the outer housing of the second liftgate column, the second plurality of buttons being arranged to project outwardly from the mounting wall of the second liftgate column and mate with the plurality of keyholes of the second vertical mounting member;
   wherein the first vertical mounting member further comprises a bolt hole and a fixed nut associated with the bolt hole, the first liftgate column further comprises a mounting hole through the mounting wall thereof, and the apparatus further comprises a first bolt configured to extend through the mounting hole in the mounting wall of the first liftgate column and through the bolt hole in the first vertical mounting member to threadably engage with the fixed nut of the first vertical mounting member;
   wherein the second vertical mounting member further comprises a bolt hole and a fixed nut associated with the bolt hole, the second liftgate column further comprises a mounting hole through the mounting wall thereof, and the apparatus further comprises a second bolt configured to extend through the mounting hole in the mounting wall of the second liftgate column and through the bolt hole in the second vertical mounting member to threadably engage with the fixed nut of the second vertical mounting member
   wherein the transverse bridge member of the bracket assembly comprises a plurality of auxiliary bolt holes and a plurality of auxiliary fixed nuts respectively associated with the plurality of auxiliary bolt holes in the transverse bridge member;
   wherein the traverse member of the liftgate comprises a plurality of auxiliary mounting holes through a front wall thereof; and
   wherein the apparatus further comprises a plurality of auxiliary bolts configured to extend respectively through the plurality of auxiliary mounting holes in the front wall of the traverse member and through the plurality of auxiliary bolt holes in the transverse bridge member to threadably engage with the plurality of auxiliary fixed nuts of the transverse bridge member.

2. The apparatus according to claim 1, wherein:
   each of the plurality of keyholes of the first vertical mounting member and each of the plurality of keyholes of the second vertical mounting member includes a narrow portion and a wide portion above the narrow portion;
   each of the first plurality of buttons includes a stem extending from the mounting wall of the first liftgate column and a head at a distal end of the stem, wherein each of the first plurality of buttons mates with a corresponding one of the plurality of keyholes of the first vertical mounting member by inserting the head of the button into the wide portion of the corresponding keyhole and lowering the liftgate relative to the mounting member such that the stem of the button passes through the narrow portion of the corresponding keyhole, wherein the head of the button is wider than the narrow portion of the corresponding keyhole; and
   each of the second plurality of buttons includes a stem extending from the mounting wall of the second liftgate column and a head at a distal end of the stem, wherein each of the second plurality of buttons mates with a corresponding one of the plurality of keyholes of the second vertical mounting member by inserting the head of the button into the wide portion of the corresponding keyhole and lowering the liftgate relative to the mounting member such that the stem of the button passes through the narrow portion of the corresponding keyhole, wherein the head of the button is wider than the narrow portion of the corresponding keyhole.

3. A method for mounting a liftgate column on a vehicle, wherein the liftgate column comprises an outer housing having a mounting wall including a mounting hole therethrough, and a plurality of buttons attached to the outer housing and arranged to project outwardly from the mounting wall, the method comprising:
   A) providing a mounting member configured to be welded to a vehicle, the mounting member including a plurality of keyholes and a bolt hole;
   B) positioning the liftgate column relative to the mounting member such that the plurality of buttons are aligned with the plurality of keyholes;
   C) moving the liftgate column relative to the mounting member such that the plurality of buttons are received by the plurality of keyholes;
   D) moving the liftgate column relative to the mounting member to mate the plurality of buttons with the plurality of keyholes;
   E) installing a bolt to extend through the mounting hole in the mounting wall and through the bolt hole of the mounting member;
   F) threadably engaging the bolt with a nut; and
   G) welding the mounting member to the vehicle.

4. The method according to claim 3, wherein the liftgate column is a first liftgate column of a liftgate assembly having a second liftgate column opposite the first liftgate column, the method further comprising:
   providing another mounting member configured to be welded to the vehicle, the another mounting member including a plurality of keyholes and a bolt hole;

performing steps (B) through (G) with respect to the second liftgate column and the another mounting member.

5. The method according to claim 3, wherein steps (A) through (F) are performed before performing step (G).

6. The method according to claim 3, wherein step (G) is performed before performing any of steps (B) through (F).

* * * * *